United States Patent [19]

Saalfeld

[11] Patent Number: 4,747,489

[45] Date of Patent: May 31, 1988

[54] DEVICE FOR SETTING DOWN BEVERAGE CONTAINERS, PREFERABLY IN VEHICLES

[76] Inventor: Hergen Saalfeld, Scheunebergstrasse 23, 2870 Delmenhorst, Fed. Rep. of Germany

[21] Appl. No.: 896,122

[22] Filed: Aug. 13, 1986

[30] Foreign Application Priority Data

Aug. 13, 1985 [DE] Fed. Rep. of Germany ... 8523246[U]
Dec. 24, 1985 [DE] Fed. Rep. of Germany ....... 3546034

[51] Int. Cl.$^4$ ..................... B65D 6/04; B65D 81/00; B60R 7/00

[52] U.S. Cl. ..................... 206/446; 211/81; 224/42.45 R; 248/133; 248/137; 248/143

[58] Field of Search ........................ 206/426, 446, 583; 211/79–81, 165, 168, 170, 171; 224/42.45 R; 220/23.83; 248/130, 133, 137–140, 141, 143, 364

[56] References Cited

U.S. PATENT DOCUMENTS

| | | | |
|---|---|---|---|
| 1,083,861 | 1/1914 | Schirl | 248/137 |
| 2,071,276 | 2/1937 | Barbiers | 248/137 |
| 2,748,952 | 6/1956 | Fleit et al. | 248/133 |
| 2,926,879 | 3/1960 | Dietrich | 224/42.45 R |
| 3,122,257 | 2/1964 | Soehrman | 248/133 |
| 3,842,981 | 10/1974 | Lambert | 224/42.45 R |
| 4,474,354 | 10/1984 | Field | 211/81 |

FOREIGN PATENT DOCUMENTS

| | | | |
|---|---|---|---|
| 0271234 | 3/1914 | Fed. Rep. of Germany | 248/133 |
| 0600359 | 2/1926 | France | 248/143 |

Primary Examiner—Jimmy G. Foster
Attorney, Agent, or Firm—Cedric M. Richeson

[57] ABSTRACT

The invention is concerned with a device for setting down beverage containers, especially open beverage containers, preferably in vehicles.

The purpose of the invention is to create a device of the type described above, which prevents the splashing of a liquid from a beverage container during the movements of the vehicle and prevents tipping of the beverage containers, and which can be handled simply, preferably even with one hand.

According to the invention, this task is solved by a device which is characterized by the fact that it has a holder that can be set up in the vehicle, that a container receptacle is seated in this holder so that the receptacle can follow a pendulum movement and by the fact that the container receptacle has a guide to guide the pendulum movements.

In a preferred mode of execution, the guide is a recess on the top part of holder, and the container receptacle is placed in it with positive locking.

14 Claims, 4 Drawing Sheets

DEVICE FOR SETTING DOWN BEVERAGE CONTAINERS, PREFERABLY IN VEHICLES

The invention is concerned with a device for setting down beverage containers, especially open beverage containers, preferably in vehicles.

There are holders known that can be set up in vehicles, these holders serving for holding beverage containers. The holders prevent tipping of the beverage container, so that an occupant of the vehicle can put down his or her beverage container even when the vehicle is in motion and has to hold the beverage container only when drinking. Thus, the occupant's hands are free most of the time because he or she does not have to hold the bevearge container continuously.

When an open beverage container is placed into a holder of the art, the problem occurs that, although the beverage container is secured in the holder against tipping, however, the liquid content of the beverage container can spill from the beverage container, especially during sudden movement of the vehicle. In order to hinder this spilling, there is a holder known, for example, with a spring-loaded cover, which is placed on the opening of the beverage container as a closure when it is placed in the holder. In order to be able to remove the beverage container from the holder again, the cover of the holder must be removed and, at the same time, the beverage container must be removed from the holder, but, for example, the driver of the vehicle during driving has only one hand available to do this so that picking up of the beverage container is not only uncomfortable, but also distracts the driver of the vehicle in a dangerous manner. In addition, the liquid contained in the beverage container splashes against the cover, which may be result in sticking that is difficult to counteract, for example, when the beverage container contains lemonade. In addition, only those beverage containers can be placed in the holder, the dimensions of which correspond to the dimensions of the holder, for example, to the diameter of the cover and to the constructive height of the holder.

The purpose of the invention is to create a device explained at the outset, which device prevents the spilling of the liquid from a beverage container during movement of a vehicle and prevents tipping of the beverage container and which can be handled in a simple manner, for example, with one hand.

The task of the invention was solved by a device which is characterized by the fact that it has a holder that can be attached to the vehicle on which a container receptacle is seated in a pendular manner and that the holder has a guide which guides the container receptacle in its pendular movements.

The beverage receptacle, onto which the beverage container can be placed, is arranged so that it can move relative to the holder in such a way that it does not follow the changes of position of the vehicle. During acceleration of the vehicle, for example, when the velocity is increased or when the vehicle moves along a curve, the substantially horizontal forces act on the holder of the device that is set up in the vehicle. Since the container receptacle and the holder of the device are coupled to one another only relatively weakly, these forces are not fully transferred onto the container receptacle, so that, due to its inertia, the container receptacle attempts to remain in its state of motion and adapts only gradually to the changed state of motion of the vehicle. No sudden movements are transferred to the beverage container placed on the receptacle, so that, when the motion of the vehicle changes, it will neither tip nor liquid will splash out of it. As a result of the guide of the holder, the beverage receptacle is guided forcibly so that, as a result of its relative motion to the holder, it receives the forces acting on the beverage receptacle that could lead to the tipping of the beverage container or spilling of the liquid and it acts against these forces by slaving of the beverage container during its pendular movement.

The beverage container can be set down in a simple manner onto the container receptacle, especially also with one hand. For example, the holder can be placed on a bracket of the car or on a table in a train or ship, but, for example, it can also be placed on a wall.

In a preferred design of the device, the guides of the holder are in the form of a recess. When the container receptacle performs its pendular motion in this recess, it is guided by the wall of the recess in such a way that it will be tipped relative to the holder, namely, in a direction that counteracts the direction of tipping of the inertial forces acting on the beverage container when the motion of the vehicle changes, so that, as a result, the beverage container remains on the container receptacle. Similarly, the inertial forces acting on the liquid in the beverage container are also counteracted, so that no liquid will splash out from the beverage container.

A further development of the device is characterized by the fact that the recess is a ball socket, that the container receptacle and the holder are engaged in the form of a ball-and-socket joint, that, on the side opposite to its ball-socket side, the container receptacle has a surface onto which the beverage container can be placed and that the center of curvature of the ball socket is above the container receptacle. During its pendular motion, the container receptacle oscillates around the center of curvature, guided by the ball socket. Preferably, the radius of curvature of the ball socket is chosen large enough so that the center of curvature of the ball socket is as high above the container receptacle as the surface of the liquid of a liquid contained in the beverage container placed on the container receptacle. If the center of curvature of the ball socket, which is simultaneously the center of motion of the container receptacle, lies at about this height, then the spilling of the liquid from the beverage container will reliably be prevented. By appropriate design of the place for the container on the container receptacle, for example, by having a circular recess, one can determine the maximum diameter of the beverage container placed on the container receptacle. In the usual beverage containers, the height of the beverage container usually correlates with the diameter of its base, so that when producing the device according to the invention, one can establish an approximate relationship between the diameter of the place on the container receptacle where the container is placed and the radius of curvature of the ball socket.

In order to obtain guidance of the container receptacle with as little friction as possible, rolling parts are placed between the container receptacle and the wall of the recess.

Preferably, the container receptacle has a weight in its lower region, as a result of which the container receptacle assumes an asymmetric mass distribution and the center of gravity of the container receptacle is displaced downward as much as possible so that the container receptacle can move in the recess in a rolling-pendular motion. Preferably there is an opening in the wall of the recess in its lower region, through which the weight penetrates downward into the holder in an approximate perpendicular direction. However, the weight can also be an addition made of lead or similar material, with a higher specific gravity, placed in the recess, in the lower region of the container receptacle.

According to the further development of the invention, the device has a damping arrangement which damps the pendular movement of the container receptacle, so that the container receptacle performing the pendular movement comes to a rest as rapidly as possible. Preferably, the damping arrangement is placed below the recess and has a vat filled with a viscous fluid into which the weight of the container receptacle is immersed. The viscous fluid brakes the container receptacle during each pendular movement so that the pendular movements of the container receptacle come to a rest relatively rapidly and that the container receptacle comes to its resting position where the beverage container placed on it is in a vertical position.

The damping of the damping device can be varied in a further advantageous mode of execution of the invention by securing the weight on the container receptacle with the aid of a bolt, the bolt having a thread, with the aid of which the bolt can be positioned at a variable depth in the container receptacle. By varying the length of the section of the bolt that protrudes from the container receptacle, the depth of immersion of the weight into the fluid and thus the degree of damping can be altered. The container receptacle itself may have an internal thread, but, for example, the bolt can also be attached to the container receptacle with the aid of a nut.

Preferably, the weight has a larger cross-section than the opening and the bolt can be brought into the container receptacle to the stop of the weight on the bottom side of the opening and can be stopped in this position. This position of the bolt can serve advantageously as the transport position of the device during the time when it is not in use, because, in this position, the weight closes the opening and thus prevents the spilling of the liquid in the damping device.

According to another further development of the device, not only the container receptacle is secured so it can oscillate, but the device has a support also which can be arranged in the vehicle, and that the holder is placed on this support so that it can oscillate in a horizontal plane so that especially short-term sudden changes of motion of the vehicle are compensated by the oscillation of the holder itself.

Preferably, the device is characterized by the fact that the holder has a plane base, with which it is placed on a seat surface of the support, that a tappet is arranged on the base, which protrudes perpendicularly downward into the support through an opening in the seat surface and that a spring component is braced between the tappet and the side walls of the support. As a result of the braced spring elements, which are arranged, for example, in a cross-form and can be spiral springs, rubber pieces or similar, the holder can perform pendular movements in the horizontal plane. To prevent the support from simultaneously performing tipping movements, which may lead to the tipping of the beverage container set on it, the tappet has a supporting plate, which preferably protrudes in the radial direction and flanges the edges of the opening of the seat surface.

The spring components themselves serve to damp the oscillation of the holder, which, in a preferred mode of execution of the device, is further supported with the aid of a viscous fluid that is filled into the support and into which the lower free end of the tappet is immersed.

Modes of execution which further indicate the characteristics of the invention are shown in the drawing. The following are shown:

Figure 1:
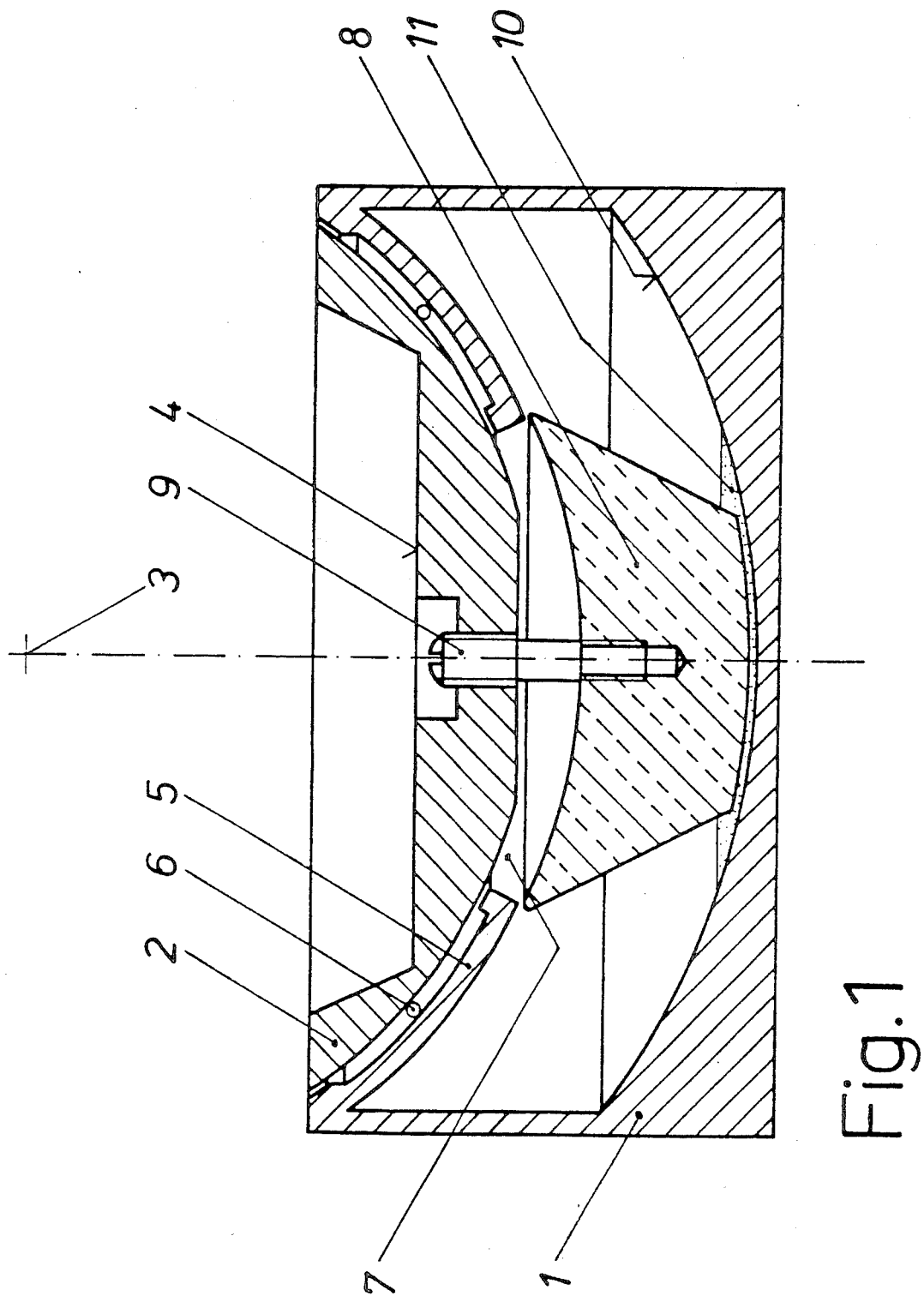
FIG. 1 is a section through a first mode of execution of a device according to the invention.

FIG. 1 shows a first mode of execution of a device according to the invention. The device has a holder, 1, which has a recess on its upper surface, the recess designed in the form of a ball socket, into which the container receptacle, 2, is set in such a way that the container receptacle, 2, and holder 1, interlock as a ball-and-socket joint. The container receptacle 2, can move in a pendular manner around the center of curvature, 3, of the ball socket. On the side opposite to the ball socket, the container receptacle has a disk-like seat, 4, for the placement of a beverage container. Rolling parts, 6, are arranged between wall 5 of the ball socket and container receptacle 2, these rolling parts permitting movement of the container receptacle in the ball socket with as little friction as possible.

Wall 5 of the ball socket has an opening, 7, in its lower region, through which opening a weight, 8, located in the lower region of container receptacle 2 protrudes downward into the holder. Weight 8 is secured with the aid of bolt 9, which reaches the edges of opening 7 in the end position of the swings of container receptacle 2, whereby in the end position of the swings, container receptacle 2 is locked by weight 8, which flanges the wall, 5, of the ball socket, so that it cannot slip out from the ball socket.

Below container receptacle 2, there is a vat, 10, in holder 1, as a part of a damping device, a viscous fluid, 11, being filled into the vat and weight 8 immersing into this fluid. Bolt 9 has a set screw with which the depth of immersion of weight 8 can be adjusted.

Figure 2:
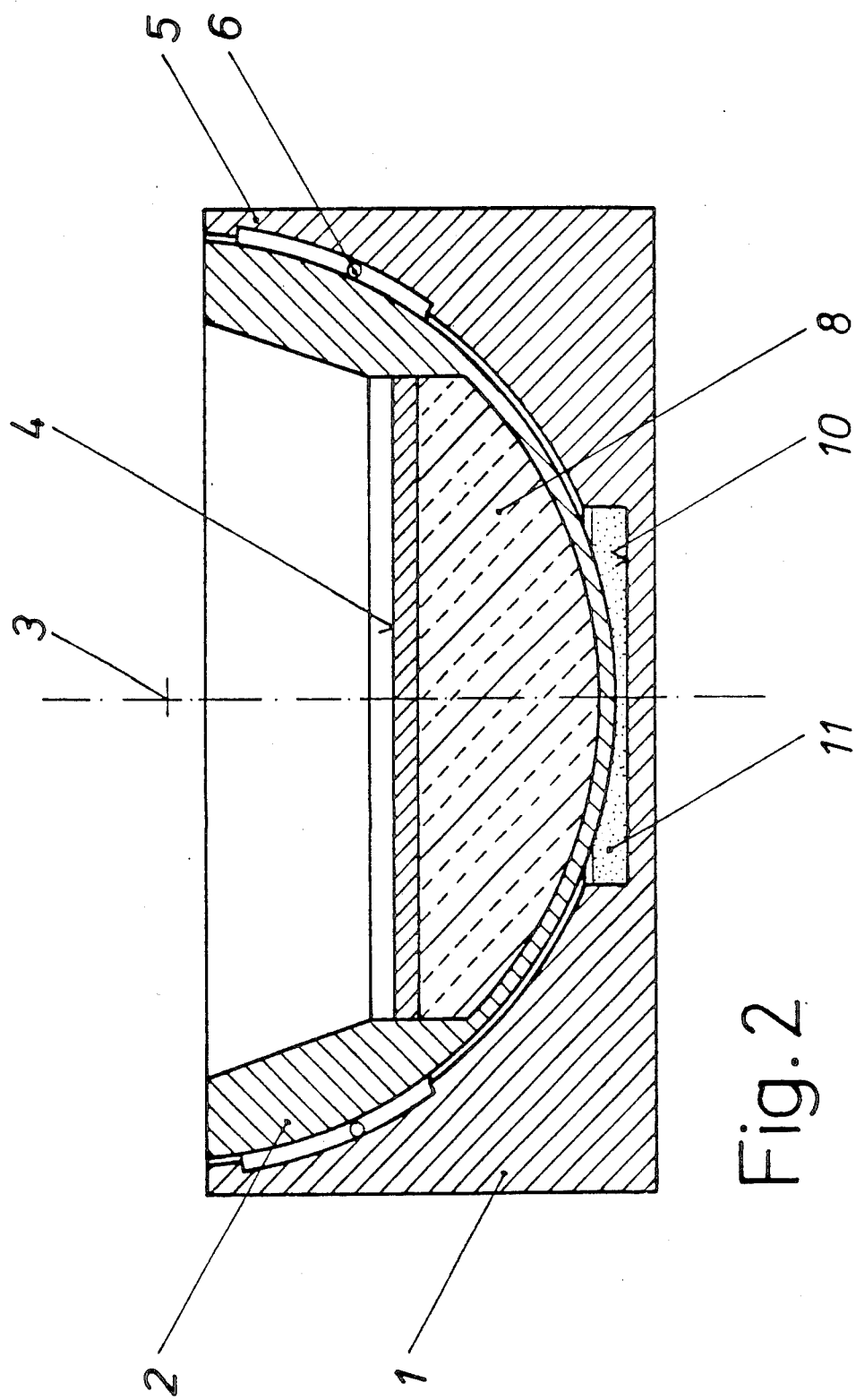
FIG. 2 is a section through a second mode of execution of a device according to the invention.

FIG. 2 shows a second mode of execution of a device according to the invention. The same constructional elements are designated with the same reference numbers as in FIG. 1.

The device according to FIG. 2 differs from the device according to FIG. 1, especially by the fact that weight 8 is arranged in the region of container receptacle 2, which is resting in the ball socket.

Figure 3:
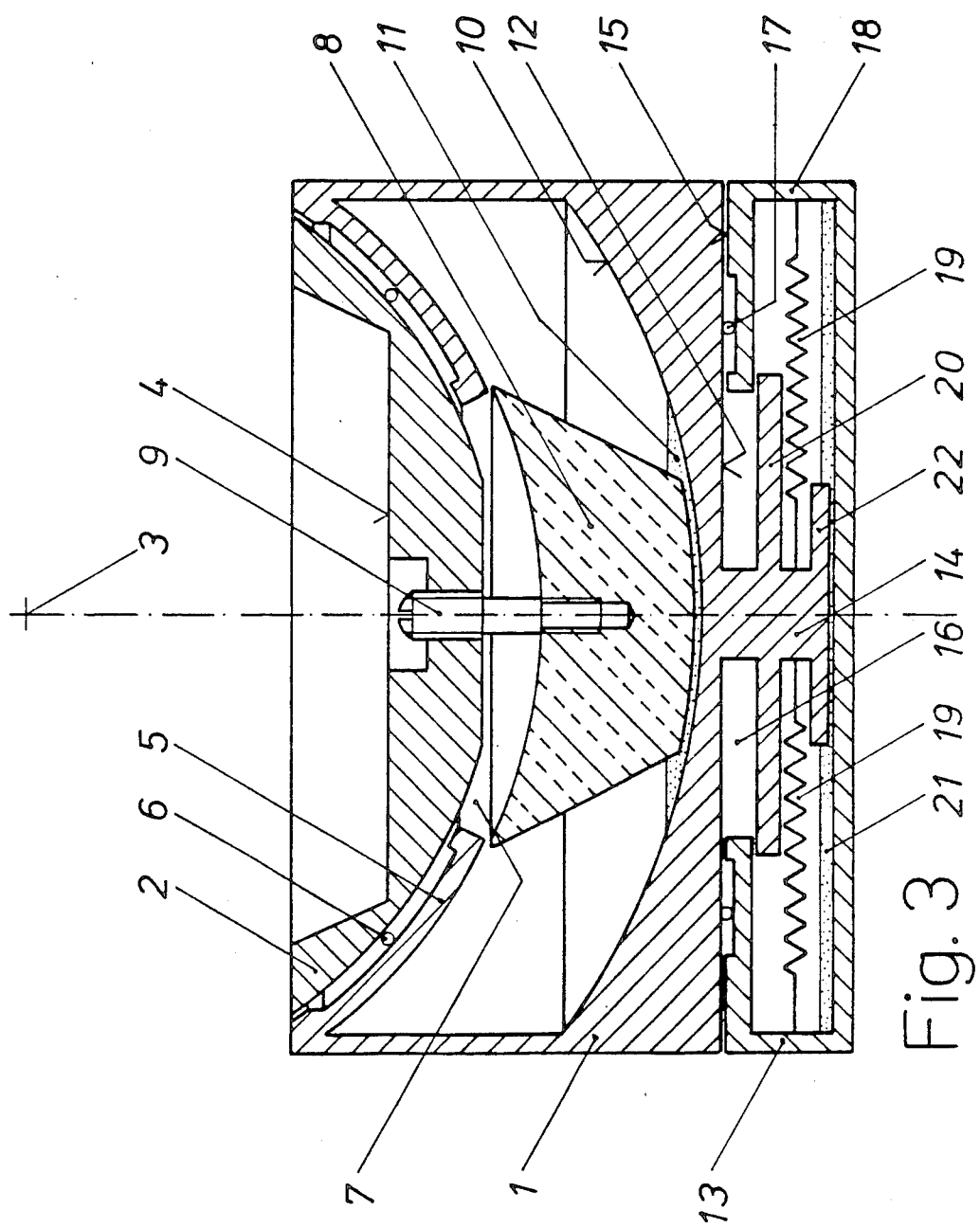
FIG. 3 is a device according to FIG. 1 with an additional support in the rest position and FIG. 4 is a device according to FIG. 3 in the deviated position.

FIG. 3 shows a device which corresponds to a large extent to the device of FIG. 1. The same constructional elements are designated with the same reference numbers as in FIG. 1. In FIG. 3, holder 1 has a tappet, 14, which protrudes from base 12, perpendicularly downward. Holder 1 is placed with its base 12 on seat surface 15 of support 13. The seat surface, 15, has an opening 16, through which tappet 14 of holder 1 protrudes into the support. Rolling components 17 are placed between seat surface 15 and base 12 to provide movement of holder 1 with as little friction as possible.

Spring components 19 are braced in a horizontal plane between side walls 18 of support 13 and tappet 14 of holder 1, so that holder 1 is arranged in a horizontal plane so that it can oscillate in support 13.

A supporting plate 20 is arranged on tappet 14, this plate protruding from tappet 14 in a radial direction and flanging the edges of opening 16 to prevent tipping of holder 1. The lower free end of tappet 14 is immersed into a viscous fluid 21 filled into support 13. In order to increase the area of tappet 14 which is in contact with viscous fluid 21, tappet 14 has a glide plate 22, which protrudes radially from tappet 14 and is placed on the free end of the tappet.

Figure 4:
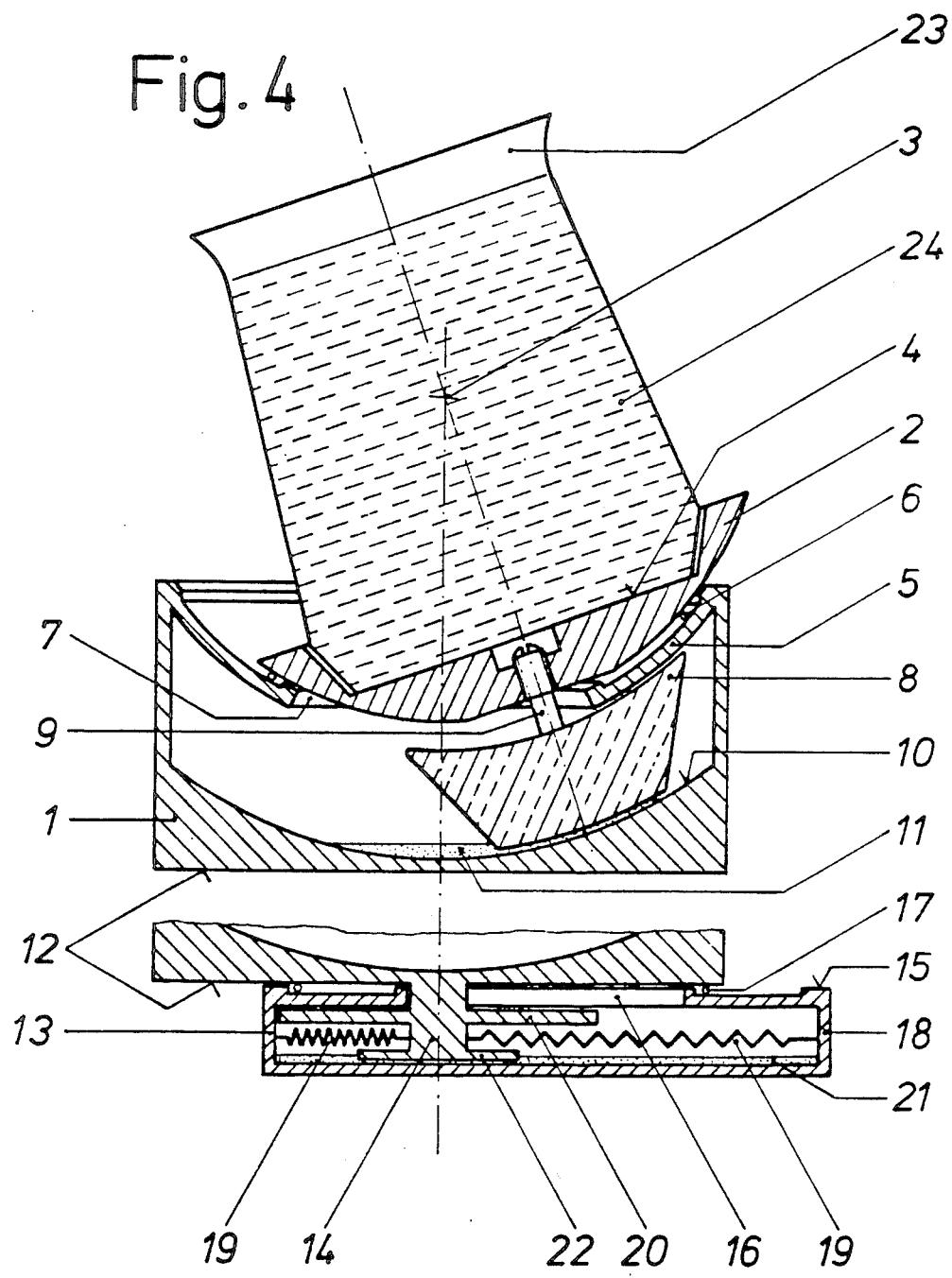

FIG. 4 shows a device according to FIG. 3, in which both holder 1 and support 13 as well as container receptacle 2 in holder 1 are shown in the deflected position. Both components are given the same reference numbers as in FIG. 3.

In order to illustrate the mode of operation of the device better, an open beverage container, 23, is placed on container receptacle 2 in FIG. 4, the beverage container containing a liquid, 24.

In view of the above description and drawings, further modifications of the invention disclosed will be apparent to those skilled in the art and all such modifications are deemed within the scope of the invention as defined by the following claims.

What is claimed is:

1. A device for holding beverage containers comprising a holder and a container receptacle seated in said holder, said receptacle adapted for pendulum movement, said holder having guide means for guiding said receptacle in its pendulum movements wherein a center of curvature of said receptacle in its pendulum movements lies above said guide means and said guide means comprises a recessed surface located on top of said holder to which recessed surface said receptacle is positively and movably attached by means for attaching said receptacle to said holder, wherein said recessed surface comprises a ball socket and said receptacle and said holder are adapted to form an interlocking ball and socket joint whereby said receptacle has a seat opposite said ball socket, said seat adapted to receive a beverage container, and a center of curvature of said ball socket lies above said receptacle.

2. A device for holding beverage containers comprising a holder and a container receptacle seated in said holder, said receptacle adapted for pendulum movement, said holder having guide means for guiding said receptacle in its pendulum movements wherein a center of curvature of said receptacle in its pendulum movements lies above said guide means, wherein said receptacle has a weight located distal from said center of curvature, and wherein said guide means comprises a recessed surface located on top of said holder to which recessed surface said receptable is positively and movably attached by means for attaching said receptacle to said holder and said recessed surface has a centrally located opening through which a weighted portion of said receptacle extends downward into said holder.

3. A device as defined in claim 2 further comprising damping means for damping said pendulum movement of said container receptacle.

4. A device as defined in claim 3 wherein said damping means comprises a vat located below said recessed surface and containing a viscous fluid into which said weighted portion of said receptacle extends.

5. A device as defined in claim 3 wherein said container receptacle has a upper portion attached to said lower weighted portion with adjustment means for varying the depth between said upper and lower portions.

6. A device as defined in claim 5 wherein said lower weighted portion has a cross-section larger than the cross-section of said recessed surface opening and wherein said adjustment means comprise an adjustable bolt connecting said upper portion of said receptacle with a lower attached weight.

7. A device as defined in claim 2 wherein said weighted portion is adjustably secured to an upper portion of said container receptacle by an adjustable bolt adapted for adjusting the depth of said weighted portion relative to said upper portion of said receptacle.

8. A device for holding beverage containers comprising a holder and a container receptacle seated in said holder, said receptacle adapted for pendulum movement, said holder having guide means for guiding said receptacle in its pendulum movements wherein a center of curvature of said receptacle in its pendulum movements lies above said guide means, further comprising a support adapted for supporting said holder upright while allowing said holder to slide horizontally, wherein said holder has (i) a flat base surface adapted for placement onto a seat surface of said support, and (ii) a tappet extending perpendicularly downward from said base through an opening in said support seat surface into said support and wherein said tappet has attached spring components which connect said tappet to side walls of said support.

9. A device as defined in claim 8 wherein said tappet further comprises a supporting plate which extends radially from said tappet flanging outward to the edge of said seat surface opening.

10. A device as defined according to claim 8 wherein said support contains a viscous fluid into which fluid a lower end surface of said tappet extends.

11. A device for holding an open beverage container in a vehicle comprising a holder, a container receptacle, and a weight wherein said holder has an arcuate top surface adapted to receive a movably attached arcuate lower surface of said container receptacle, said top holder surface having a centrally located opening therethrough and defining with a side wall and a bottom surface of said holder an open space to accommodate arcuate movement of said weight, said weight connected to said container receptacle by centrally located connector means, said receptacle having an arcuate lower surface adapted for movable attachment to said arcuate top surface of said holder and said receptacle having a top surface adapted to receive a beverage container bottom.

12. A device as defined in claim 11 wherein said receptacle top surface has an upwardly extending side wall guide for centering said beverage container on said receptacle.

13. A device as defined in claim 12 wherein said connector means comprises means for adjusting the depth of said weight into said viscous fluid.

14. A device as defined in claim 11 wherein said holder open space contains a viscous fluid into which said weight extends.

* * * * *